United States Patent
Galotto et al.

(10) Patent No.: US 12,514,804 B2
(45) Date of Patent: Jan. 6, 2026

(54) TRANSPARENT COLORED COSMETIC INGREDIENT FOR COSMETIC PRODUCTS, POSSIBLY CAPABLE OF AUTOMATICALLY CHANGING COLOR WHEN IRRADIATED BY ULTRAVIOLET LIGHT

(71) Applicant: INTERCOS S.P.A., Milan (IT)

(72) Inventors: Nella Galotto, Lomagna (IT); Claudio Pirovano, Verderio (IT); Patrizia Valsesia, Calco (IT); Luca Beverina, Milan (IT); Federica Saligari, Grosotto (IT); Sara Bettinelli, Parabiago (IT); Gabriele Depta, Monza (IT)

(73) Assignee: INTERCOS S.P.A., Milan (IT)

( * ) Notice: Subject to any disclaimer, the term of this patent is extended or adjusted under 35 U.S.C. 154(b) by 462 days.

(21) Appl. No.: 17/798,779

(22) PCT Filed: Feb. 15, 2021

(86) PCT No.: PCT/EP2021/053655
§ 371 (c)(1),
(2) Date: Aug. 10, 2022

(87) PCT Pub. No.: WO2021/165207
PCT Pub. Date: Aug. 26, 2021

(65) Prior Publication Data
US 2023/0094852 A1  Mar. 30, 2023

(30) Foreign Application Priority Data

Feb. 17, 2020  (IT) .................. 102020000003134

(51) Int. Cl.
| | |
|---|---|
| *A61K 8/81* | (2006.01) |
| *A61K 8/49* | (2006.01) |
| *A61K 8/87* | (2006.01) |
| *A61K 8/893* | (2006.01) |
| *A61Q 1/04* | (2006.01) |
| *A61Q 1/10* | (2006.01) |
| *C08G 77/388* | (2006.01) |

(52) U.S. Cl.
CPC ............ *A61K 8/498* (2013.01); *A61K 8/87* (2013.01); *A61K 8/893* (2013.01); *A61Q 1/04* (2013.01); *A61Q 1/10* (2013.01); *C08G 77/388* (2013.01); *A61K 2800/262* (2013.01); *A61K 2800/438* (2013.01); *A61K 2800/57* (2013.01); *A61K 2800/94* (2013.01); *A61K 2800/95* (2013.01)

(58) Field of Classification Search
None
See application file for complete search history.

(56) References Cited

U.S. PATENT DOCUMENTS 5,322,945 A * 6/1994 Krongauz ............ C07D 498/10
                                                 252/586
2003/0193044 A1  10/2003 Henry et al.

FOREIGN PATENT DOCUMENTS

| JP | 61-275209 | 12/1986 |
|---|---|---|
| WO | 2009/141237 | 11/2009 |

OTHER PUBLICATIONS

International Search Report (ISR) and Written Opinion of the International Searching Authority issued May 10, 2021 in International (PCT) Application No. PCT/EP2021/053655.
International Preliminary Report on Patentability issued Feb. 25, 2022 in International (PCT) Application No. PCT/EP2021/053655.

* cited by examiner

*Primary Examiner* — Brian Gulledge
(74) *Attorney, Agent, or Firm* — Wenderoth, Lind & Ponack, L.L.P.

(57) ABSTRACT

A cosmetic ingredient for cosmetic products has a polymer structure which includes an emollient or film-forming cosmetic polymer which is transparent to light. An organic chromophore molecule is inserted and chemically linked into the polymer, which can be a fixed color molecule or a photochromic molecule capable of rapidly switching from one color to another. The colored or photochromic molecule is inserted and chemically linked by transesterification into a cosmetic oil provided with functionalities which are suitable for the chemical anchoring of the molecule and chemically linked to said oil. The cosmetic oil may be a silicone macrodiol functionalized with a photochromic derivative designed so as to ensure the transition between a colorless state and a colored state following irradiation with ultraviolet light.

4 Claims, No Drawings

TRANSPARENT COLORED COSMETIC INGREDIENT FOR COSMETIC PRODUCTS, POSSIBLY CAPABLE OF AUTOMATICALLY CHANGING COLOR WHEN IRRADIATED BY ULTRAVIOLET LIGHT

The present invention relates to a transparent colored cosmetic ingredient for cosmetic products, which is possibly capable of automatically changing color when exposed to ultraviolet (UV) light.

Since ancient times, color has been a fundamental factor for the exaltation of beauty, in particular female beauty.

The Egyptians used powders and mixtures to decorate the body, warriors used them to instill fear among adversaries. Similarly, coloring the skin was a widespread custom in the Americas, both among the indigenous people and among the American Indians.

First impressions were and still are an essential component in everyday life. Products must refer to all the senses in order to evoke that series of emotional responses which inspire the consumer.

Over time, make-up has taken on a more complex and elaborate meaning, becoming a cosmetic practice aimed at improving a person's body image.

Therefore, color psychology has a long history, but the evaluation thereof has only reached a much more scientific approach in recent years with the development of models allowing predicting the human emotional response to colors and the combinations thereof.

The first theories aimed at explaining the nature of color date back to the 17th century, when it was recognized that color is first and foremost a physical feature, due to the interaction between light, matter at an electronic level, and object shape.

Various dyes have been used in cosmetics and over time there have been attempts to improve the properties thereof, such as shine, following the fashions of the moment and consumer requests. The continuous development of new trends on the cosmetic market, of specific and diversified requests for cosmetic products are indicative of a constant need to create new and more sophisticated formulations which cause new benefits and special effects.

With a view to meeting the new needs of consumers, the possibility of breaking the static nature of the colors of the formulations was considered, by exploiting a known chemical phenomenon, photochromism, to obtain an innovative and exclusive product which can amaze.

Photochromism is a physical phenomenon based on a reversible reaction which transforms a molecule from a state A to a state B following the absorption of an electromagnetic radiation. The two states A and B are isomers in that the photochemical excitation causes a rearrangement of the electronic and nuclear structures of the molecule. They mainly differ in the absorption spectra thereof. The initial stable state A absorbs in the ultraviolet spectral region and for such a reason it is generally colorless, while the higher-energy state B absorbs in the visible region and is intensely colored.

The term "photochromism" comes from the Greek words "phos" (light) and "chroma" (color) and means "color change due to the effect of light." The molecules capable of manifesting this particular phenomenon are defined "photochromic."

Such molecules can find application in the industrial field if they meet certain requirements such as: rapid activation of the color change process (also referred to as a "switch"), high efficiency, and finally solubility in the matrix where the molecules are incorporated.

Photochromic molecules have been developed, such as spiropyrans and spiroxazines, which change color by virtue of UV-A radiation, the most accessible wavelength of the solar spectrum. The high efficiency of these compounds and the marked switching speed have allowed them to be used for the production of photochromic lenses.

The introduction of new molecules in cosmetics is always a delicate operation, because substances with low molecular weights, such as that of a molecule, could be absorbed by the skin.

JP S61 275209 A describes the synthesis of a cosmetic composition with polyolefin polymer, in which a chromophore molecule is directly linked to a monomer which is repeated throughout the polyolefin chain.

US 2003/193044 A1 describes chromophore compositions comprising cross-linked non-cosmetic polyurethanes, in which the chromophore molecule is not chemically linked to the polymer, but only mixed and for which a cosmetic application is not expected.

U.S. Pat. No. 5,322,945 A describes processes for preparing linear photochromic polysiloxanes, in which a chromophore molecule of the spiroxazines class is chemically linked to a monomer which is repeated along the entire chain.

It is now the object of the present invention to provide a cosmetic ingredient for a cosmetic product which allows the latter to be colored and simultaneously transparent in all the forms thereof and under all conditions of use, and possibly capable of automatically changing color when stimulated by an ultraviolet light.

In accordance with the invention, such an object is achieved by a cosmetic ingredient with polymer structure for cosmetic products according to the present disclosure.

The chromophore molecule can be a colored molecule of the static type, i.e., capable of remaining colored, or of the dynamic photochromic type, i.e., capable of changing color if stimulated by ultraviolet light. If of the photochromic type, the molecule will be such as to ensure a rapid and reversible switch passing from an internal environment to an external environment.

The polymer structure of the cosmetic ingredient can comprise a polyurethane-type polymer, a polysiloxane or polymers derived from linoleic acid with a cosmetic film-forming or emollient function.

The cosmetic ingredient according to the present invention allows the production of a transparent colored cosmetic product with a fixed color or possibly capable of changing color when stimulated by ultraviolet light.

In order to incorporate the colored or photochromic molecule inside the polymer, and therefore inside the cosmetic ingredient, a process according to the present disclosure can be used.

In the case of a photochromic molecule, in order to allow the insertion into the polymer, a cosmetic oil consisting of bis-hydroxyethoxypropyl dimethicone (cosmetic oil) can be functionalized by transesterification with the photochromic molecule, which has in turn been provided with the necessary functions for the anchoring thereof to dimethicone, maintaining the main cosmetic function of emollient oil. The transesterification synthesis can have been performed in the presence of a tin complex at high temperature (about 140° C.) and without a solvent.

After the photochromic molecule has undergone transesterification, the molecule itself can be used as a monomer with hydroxyl functionality in the synthesis of a polyurethane, which can be mainly alkyl or totally silicone. In the first case the synthesis is performed in the presence of diols commonly used for the synthesis of polyurethanes (such as C12-15 alkyl tartrate), isocyanates, diisocyanates with different structures (such as isophorone diisocyanate-IPDI, hexamethylene diisocyanate-HDI, diisocyanatedicyclohexylmethane-M12HDI, 3-isocyanate propyltrimethoxysilane, 3-isocyanatepropyltriethoxysilane, etc.), as per EP 2349197. In the second case the synthesis is performed in the presence of silicone diols commonly used in cosmetics (such as bis-hydroxyethoxypropyl dimethicone) and diisocyanates with different structures (such as isophorone diisocyanate-IPDI, hexamethylene diisocyanate-HDI, diisocyanatedicyclohexylmethane-M12HDI, etc.), as per EP 1588686. By suitably changing the functionality of the initial molecule, the monomer can be used for other types of polymers. The polymerization of the polyurethane can be performed in the presence of a tin and zinc complex at a temperature of 90/95° C.

The polymer obtained through the use of silicone oil can be used in a fluid cosmetic product (e.g., fluid for lips) with the secondary purpose of imparting the color change feature when subjected to ultraviolet light.

The polymer can also be incorporated into powdered products (for example, an eye powder) as a binding oil and have a secondary color changing purpose.

As an alternative to the photochromic molecule, a fixed color molecule can be used, (i.e., which does not change color but is static in the native color thereof) commercially available under the name Reactint by Milliken, which allows obtaining a colored but transparent polyurethane polymer and thus obtain cosmetic products which have this feature.

A preferred example of functionalization of a silicone macrodiol for cosmetic use with a photochromic derivative specifically designed to ensure the transition between a colorless and a colored state following ultraviolet irradiation is now described.

The best candidate for the functionalization of a macrodiol is a molecule belonging to the spiropyrans family, suitably functionalized, such as the derivative FC-C3-Et obtained with the synthetic approach schematized below.

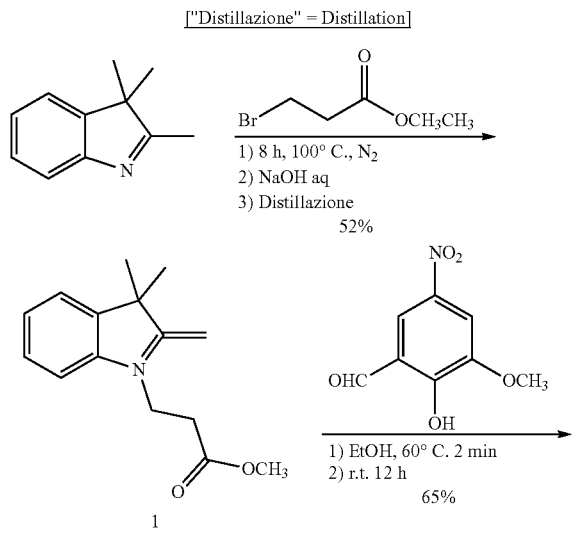

["Distillazione" = Distillation]

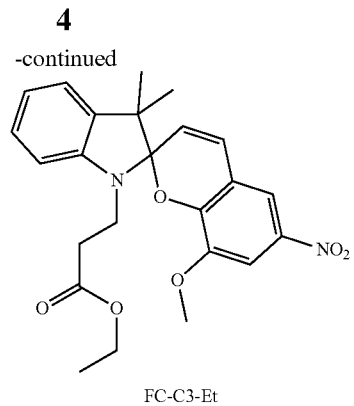

FC-C3-Et

The choice of this particular structure was made based on the following features:
A. The class of spiropyrans, typical of photochromic molecules, ensures the required performance in terms of photochromic contrast.
B. The functionalizing chain inserted on the indolenic nitrogen makes the covalent anchoring to the macrodiol possible by catalytic transesterification reaction.
C. The presence of nitro and methoxy groups on the phenyl residue ensures a correct position of the photostatic equilibrium both under irradiation conditions and dark conditions and a better photochemical stability, respectively.

In order to obtain the derivative FC-C3-Et according to the procedure indicated above, trimethylindolenine (CAS 1640-39-7) is alkylated in the absence of solvent using an ester of lower alcohols obtained starting from chain omega-bromine acids between C2 (ethylbromoacetate) and C12 (for example, ethyl 3-bromopropionate (CAS 539-74-2)). The reaction is performed between 80° C. and 140° C. in a nitrogen atmosphere from 1 to 48 hours. The stoichiometric ratio of indolenine to alkylator is between 1:1 (mol) and 1:5 (mol), preferably 1:1.5.

The viscous liquid thus obtained is dissolved in water and extracted with CH2CL2 up to a colorless organic extracting aqueous phase. The extraction has the purpose of removing excess alkylator.

The aqueous phase thus obtained is made basic (pH<12) with NaOH 5 M (or other mineral base), left under stirring for 2 hours and then extracted with CH2CL2 to obtain an organic phase which is dried on anhydrous salt to produce a viscous red oil consisting of a mixture of starting indolenine and anhydrous base. The indolenine is removed by distillation at reduced pressure to produce pure anhydrous base as very viscous red oil.

This is followed by a condensation phase of pure anhydrous base with methoxy-nitroresorcinaldehyde (CAS 17028-61-4) which is very critical: two distinct solutions of 0.5 M of anhydrous base are prepared (as per the synthetic approach previously schematized) and aldehyde in absolute ethanol and both are preheated to 60° C. The aldehyde solution is saturated at this temperature. The two solutions are rapidly mixed still in the bath at 60° C. and kept at this temperature for 120 seconds. The thermostated bath is removed and the resulting deep blue solution is left under stirring for one night. A copious gray precipitate is thus obtained which is crystallized twice by absolute ethanol.

The derivative FC-C3-Et thus obtained has a melting point of about 145° C., appears as a white crystalline solid and is very soluble in common organic solvents: It is only partially soluble in hot isododecane.

The subsequent transesterification reaction was performed under a variety of distinct experimental conditions in order to minimize the amount of organic residues present within the final functionalized macrodiol sample.

The following parameters were considered:

A. Solvent

B. Temperature

C. Duration

D. Catalyst type and stoichiometry

E. Purification

First, the most suitable transesterification catalyst was identified. Given the cosmetic use of the product, a heterogeneous phase catalyst based on dibutyltin oxide, CAS 818-08-6), was used. This catalyst works in a heterogeneous phase and can be filtered at the end of the reaction. All the following tests were conducted using a 1:0.0003 mass ratio of catalyst to bis-hydroxyethoxypropyl dimethicone, unless otherwise indicated.

As anticipated, the derivative FC-C3-Et is not soluble in isododecane nor in pure bis-hydroxyethoxypropyl dimethicone, except at temperatures above 140° C. Given the proximity of the melting temperature of FC-C3-Et to the minimum process temperature necessary to obtain a homogeneous solution of photochromic in bis-hydroxyethoxypropyl dimethicone and isododecane, the reactions were initially performed using low boiling solvents (boiling point below 120° C.-130° C.). The reactions performed in the presence of solvent are in any case slow and it is difficult to bring them to complete conversion.

A protocol conducted in the absence of solvent was therefore developed (i.e., using bis-hydroxyethoxypropyl dimethicone directly as solvent). In this case, the reactions had to be performed under vacuum to simultaneously distill the ethanol released from the photochromic precursor. The distillation temperature was found to vary between 140° C. and 160° C. for times ranging from 3 to 6 hours.

In all cases, the analyses and observations in this regard also highlighted the evolution of the bis-hydroxyethoxypropyl dimethicone alone, presumably through transesterification reactions. In fact, both the molecular weights and the viscosity of the material increase. The process is sensitive to both time and temperature.

The transesterification protocol was thus optimized: a suspension of 100 g of bis-hydroxyethoxypropyl dimethicone. 10 g of FC-C3-Et and 50 mg of dibutyltin oxide are placed under vigorous stirring and under vacuum. The mixture is brought to about 145° C., observing the gradual evolution of vapors (ethanol) and gradual dissolution of the precipitate. After about 1 hour, the suspension transformed into a homogeneous solution. The heating is maintained for another 5 hours and the reaction monitored at fixed times by 1H NMR spectrometry. At the end of the reaction, the resulting blue/green oil is cooled to room temperature, diluted with 100 ml of heptane, and placed at −20° C. for one night (to cause the precipitation of the catalyst and any other insoluble residues). The mixture is then filtered through a pleated filter and the solvent is removed under reduced pressure until constant weight. The photochromic raw material indicated below as SAMPLE I is thus obtained, resulting from the transesterification of the derivative FC-C3-Et with cosmetic oil (bis-hydroxyethoxypropyl dimethicone).

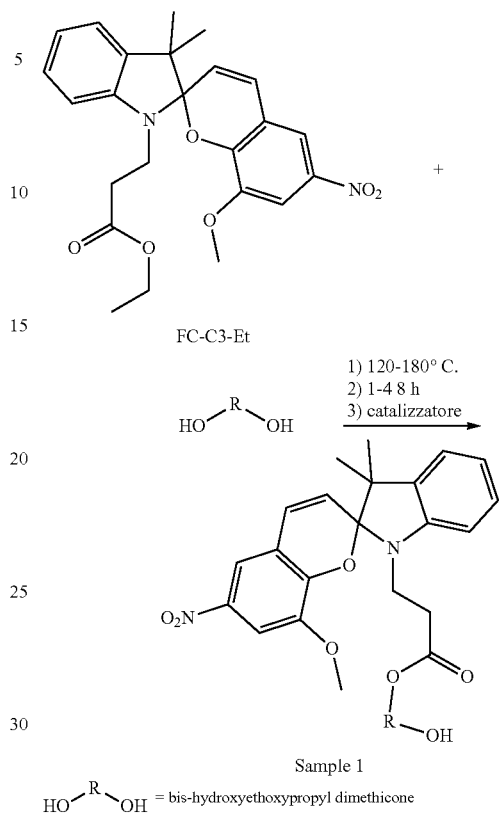

Sample 1

$HO\diagdown R\diagup OH$ = bis-hydroxyethoxypropyl dimethicone

The procedure described may include some variants, the main ones of which are listed below:

1. Bis-hydroxyethoxypropyl dimethicone/photochromic stoichiometry from 4:1 to 50:1, preferably 10:1 (mass ratios).
2. Catalyst: dibutyltin oxide or tin oxalate, using a stoichiometry from 1 to 0.00001% by weight with respect to bis-hydroxyethoxypropyl dimethicone.
3. Temperature: from 120° C. to 180° C., preferably from 130° C. to 160° C., and even better from 140° C. to 150° C.
4. Time: 1 to 48 hours, preferably 2 to 8 hours.

The cosmetic material or ingredient thus synthesized can be inserted into various cosmetic compositions. Said cosmetic compositions comprise at least one cosmetic material or ingredient described above in the function of cosmetic oil or film-forming oil in the percentage ranging from 4% to 20% by weight. Furthermore, said cosmetic materials or ingredients may have the ability to change color and/or be colored in a fixed manner.

Below are examples of different cosmetic compositions in which the cosmetic oil (Sample 1) is used as a binding oil in different percentages and which have the feature of changing color with UV light.

EXAMPLE 1: EYE SHADOW

|  | % by weight |
| --- | --- |
| viscosifier | 0.2 |
| skin conditioning agent | 1.9 |
| water | 3.0 |

-continued

| | % by weight |
|---|---|
| surfactant | 2.9 |
| SAMPLE I | 14.0 |
| emollient | 2.0 |
| dye | 72.0 |
| matting agent | 4.0 |

EXAMPLE 2: EYE SHADOW

| | % by weight |
|---|---|
| dye | 28.0 |
| skin conditioning agent | 6.0 |
| matting agent | 20.0 |
| viscosifier | 19.0 |
| SAMPLE I | 20.0 |
| skin conditioning agent | 6.0 |
| preservative | 1 |

EXAMPLE 3: LIP GLOSS

| | % by weight |
|---|---|
| emollient | 48.0 |
| skin conditioning agents | 30.0 |
| viscosifiers | 10.0 |
| dye | 5 |
| SAMPLE I | 7.0 |

EXAMPLE 4: LIP GLOSS

| | % by weight |
|---|---|
| skin conditioning agent | 17.3 |
| plasticizer | 2.2 |
| solvent | 66.8 |
| film-forming | 9.6 |
| dye | 0.1 |
| SAMPLE I | 4.0 |

Furthermore, an example of a cosmetic composition is reported herein in which at least one cosmetic material (SAMPLE II) according to the present invention was used, in the percentage of 29% by weight, which has the film-forming function and the feature of being colored in a fixed manner.

EXAMPLE 5: LIP GLOSS

| | % by weight |
|---|---|
| SAMPLE II | 29.0 |
| solvent | 28.7 |
| skin conditioning agent | 42.3 |

The main advantage of the present invention, not expected by those skilled in the art, is that, by taking a cosmetic raw material with the function of emollient oil or film-forming oil and subjecting it to transesterification with a chromophore molecule, the main cosmetic function is maintained, adding, in the case of a photochromic molecule, the ability to change color if the cosmetic product is subjected to the UV component of solar radiation.

The apparent technical advantage is that, taking a cosmetic formulation already optimized with the emollient oil or the initial film-forming oil, this formulation lends itself to being easily implemented with the ability to change the color thereof, in application, without modifying the other cosmetic performances. (texture, sensory experience, hold, etc.).

The invention claimed is:

1. A cosmetic ingredient with polymer structure for cosmetic products, wherein said polymer structure includes a cosmetic polymer with an emollient function or with a film-forming function, transparent to light both in dry and solution condition, with an organic photochromic molecule chemically linked in a covalent manner inside said polymer, wherein said photochromic molecule has a chemical structure of the spiropyran type, capable of rapidly switching from one color to another, wherein said photochromic molecule has the following structure FC-C3-Et:

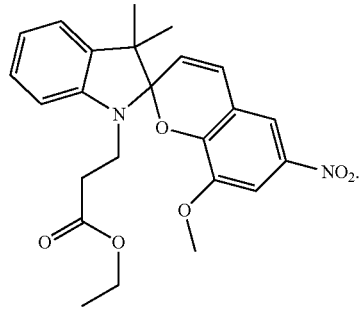 [SMILES: CCOC(=O)CCN1c2ccccc2C(C)(C)C12C=Cc1cc([N+](=O)[O-])cc(OC)c1O2]

2. The cosmetic ingredient according to claim 1, wherein that said polymer with an emollient function is made of polysiloxane.

3. The cosmetic ingredient according to claim 2, wherein that said polysiloxane is bis-hydroxyethoxypropyl dimeticone.

4. The cosmetic ingredient according to claim 1, wherein that said polymer with a cosmetic film-forming function is made of polyurethane.

* * * * *